United States Patent
Soares

[11] Patent Number: 5,921,268
[45] Date of Patent: Jul. 13, 1999

[54] CONDENSATE TRAPS

[75] Inventor: Jairo Luiz Soares, Sao Paulo, Brazil

[73] Assignee: Spirax-Sarco Limited, Glouscestershire, United Kingdom

[21] Appl. No.: 08/824,361

[22] Filed: Mar. 25, 1997

[30] Foreign Application Priority Data

Sep. 9, 1996 [GB] United Kingdom .................... 9618756

[51] Int. Cl.⁶ ........................................................ F16T 1/16
[52] U.S. Cl. ........................................... 137/183; 137/375
[58] Field of Search ..................................... 137/183, 375

[56] References Cited

U.S. PATENT DOCUMENTS

| 2,051,732 | 8/1936 | McKee . | |
|---|---|---|---|
| 2,945,505 | 7/1960 | Hansen et al. | 137/183 |
| 3,170,477 | 2/1965 | Scott et al. | 137/183 |
| 3,418,789 | 12/1968 | Hoffman et al. | 55/219 |
| 3,664,363 | 5/1972 | Miyawaki | 137/183 |
| 4,013,220 | 3/1977 | Zoller | 236/56 |
| 4,161,278 | 7/1979 | Klann et al. | 236/56 |
| 4,736,886 | 4/1988 | Oike . | |

FOREIGN PATENT DOCUMENTS 0211080  2/1987  European Pat. Off. .
46-12497  3/1971  Japan .

*Primary Examiner*—Gerald A. Michalsky
*Attorney, Agent, or Firm*—Eckert Seamans Cherin & Mellott, LLC

[57] ABSTRACT

A thermodynamic condensate trap comprises a body 2 and a cap 18 which define a chamber 24. Inlet and outlet passage 8, 10 emerge into the trap chamber 24 at a seating face 12. A valve element in the form of a disc 26 is movable within the chamber 24 to open and close a flow path through the chamber 24 between the inlet passage 8 and the outlet passage 10. The cap 18 has thermal insulating means, for example in the form of air spaces 30, 32 to reduce heat transfer between the trap chamber 24 and the ambient surroundings. This reduces the cycle time of the trap, and consequently, extends the useful life of its components.

4 Claims, 2 Drawing Sheets

CONDENSATE TRAPS

BACKGROUND OF THE INVENTION AND PRIOR ART

This invention relates to thermodynamic condensate traps, and particularly, although not exclusively, to steam traps.

A thermodynamic condensate trap comprises a trap body and a cap which define a trap chamber. A valve element is displaceable within the trap chamber between limit positions defined by a stop face on the cap and a seating face on the trap body. The trap body has inlet and outlet passages which emerge at the seating face; whereby seating of the valve element on the seating face under pressure maintained in the trap chamber isolates the inlet and outlet passages from each other thereby to close the trap.

In such a condensate trap, when used as a steam trap, the trap is kept closed by pressure generated by flash steam within the trap chamber. As the trap cools, the steam condenses and the pressure in the trap chamber falls to a level at which the valve element can be displaced away from the seating face by fluid under pressure in the inlet passage. Condensate can then flow through the trap by passing from the inlet passage to the outlet passage. Initially, the discharged condensate is relatively cold, but it becomes progressively hotter and eventually reaches a temperature at which it will re-evaporate within the trap chamber. This causes the trap to close again, and the cycle is repeated. If there is rapid heat loss from the trap chamber to the ambient surroundings, the cycle time is short, resulting in premature wear of the steam trap components.

In some circumstances it is desirable to control the loss of heat from thermodynamic condensate traps. In order to achieve this control, it has been proposed to fit a cover over the condensate trap to reduce heat loss. However, such covers represent an extra component which needs to be stocked, and they are also subject to unauthorized removal, in which case their thermally insulating properties are lost. U.S. Pat. Nos. 3,664,363 and 4,736,886 and Japanese Published Patent Specification No. 12497/71 disclose thermodynamic steam traps with additional covers.

According to the present invention there is provided a thermodynamic condensate trap comprising:

a trap body having a seating face;

a cap fitted to the trap body and having a stop face, the trap body and the cap defining a trap chamber;

a valve element which is displaceable within the trap chamber between limit positions defined by the stop face and the seating face; and inlet and outlet passages provided in the trap body and emerging at the seating face, whereby seating of the valve element on the seating face under pressure maintained in the trap chamber isolates the inlet and outlet passages from each other thereby to close the trap, wherein the cap has thermal insulating means for reducing heat transfer between the trap chamber and the ambient surroundings.

The provision of thermal insulating means in the cap, in accordance with the present invention, slows down the exchange of heat and increases the cycle time of the trap operation. This increases the useful life of the trap.

Because the thermal insulation is afforded by the cap itself, no additional components are required, and unauthorized removal cannot occur.

In a preferred embodiment of a condensate trap in accordance with the present invention, the cap has a top portion, the internal side of which has the stop face, and a skirt which defines a side wall of the trap chamber.

The thermal insulating means may be provided in either or both of the top portion and the skirt. The thermal insulating means may take the form of an air space. Thus, the thermal insulating means in the top portion may be provided by an annular recess in the outside surface of the top portion of the cap, which may be closed by a cover plate. The air space in the skirt may take the form of a circumferential recess extending around the skirt, which recess may be open at the lower region of the skirt. Where air spaces are provided in both the top portion and the skirt, these air spaces may come into close proximity with each other in the region of the outer circumference of the air space in the top portion. Thus, the air space in the skirt may extend for substantially the full height of the skirt.

DETAILED DESCRIPTION OF A PREFERRED EMBODIMENT

Figure 1:
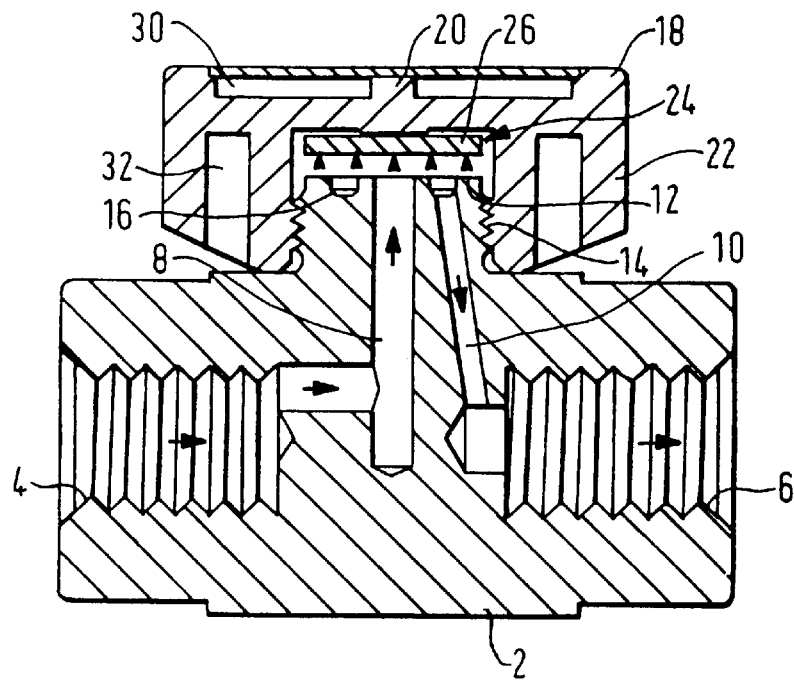
FIG. 1 is a sectional view of a steam trap in the open condition.

The steam trap shown in the Figures comprises a body 2 having an inlet 4 and an outlet 6 which are internally screw threaded for connection to a pipeline. The inlet 4 is connected to an inlet passage 8, and the outlet 6 is connected to an outlet passage 10. The inlet passage 8 and the outlet passage 10 emerge at a seating face 12 provided on the end of a spigot 14 which is externally screw threaded. The inlet passage 8 emerges on the centreline of the seating face 12, while the outlet passage 10 emerges into an annular groove 16 which surrounds the inlet passage 8.

A cap 18 is fitted to the spigot 14 by means of its screw thread. The cap 18 has a top portion 20 and a skirt 22 and defines, with the seating face 12, a trap chamber 24.

Within the chamber 24 there is a freely movable valve element in the form of a metal disc 26. The disc 26 is movable upwardly and downwardly within the chamber 24, its movement being limited by a stop face 28 on the interior surface of the top portion 20 of the cap 18, and by the seating face 12.

The body 2 and the cap 18 are made from metal, for example stainless steel. Consequently, the material of these components has a high thermal conductivity. However, the cap 18 has an annular recess 30 in the outer surface of its top portion 20, and a circumferential recess 32 in the skirt 22. The annular recess 30 is closed by a cover plate 34, while the recess 32 is open at the lower edge of the skirt 22. The recess 32 extends around the entire circumference of the skirt 22, within the thickness of the skirt.

The recesses 30 and 32 provide a partial thermal barrier between the chamber 24 and the ambient surroundings. It will be appreciated from the Figures that the two recesses 30 and 32 approach, but do not meet, one another at the outer periphery of the recess 30 and at the bottom of the recess 32.

In operation, when the steam trap is connected in a pipeline, condensate reaches the trap at the inlet 4. When operation starts from cold, steam generated upstream of the trap flows towards the trap discharging any air or condensate remaining in the system. The air and condensate flows through the inlet passage 8 and lifts the disc 26 off the seating face 12. The air and condensate can thus flow from the inlet passage 8 into the chamber 24 and thence into the groove 16 and the outlet passage 10. This condition is shown in FIG. 1.

Figure 2:
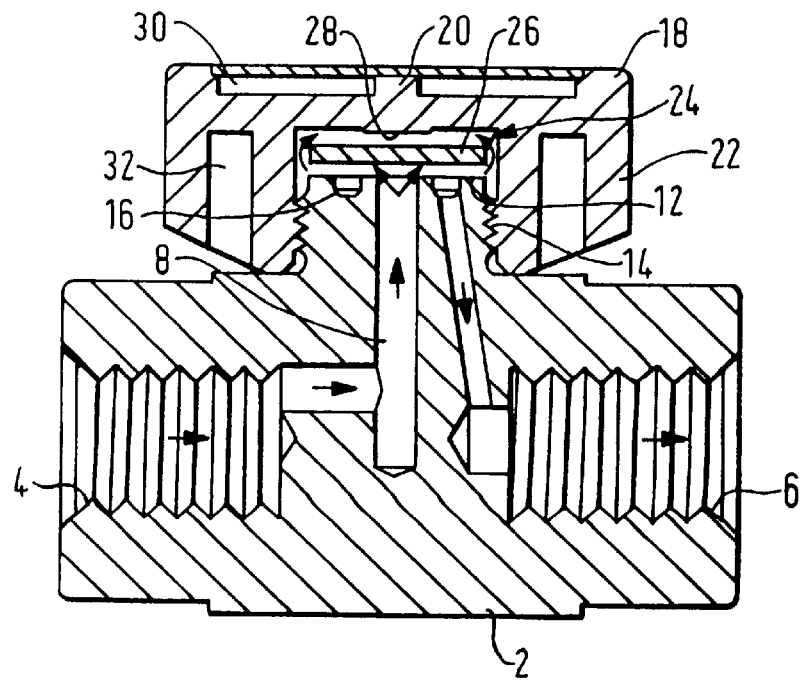
FIG. 2 corresponds to FIG. 1 but shows the steam trap in an intermediate condition.

As steam approaches the trap, the temperature of the condensate, and of the trap itself, increases. As the hot condensate passes between the disc 26 and the seating face 12, it tends to evaporate, forming flash steam. The resulting expansion causes an increase in volume of the flowing mixture of steam and condensate, so increasing the velocity. This causes a local reduction in pressure between the disc 26 and the seating face 12, causing the disc 26 to be drawn closer to the seating face 12, as shown in FIG. 2.

Figure 3:
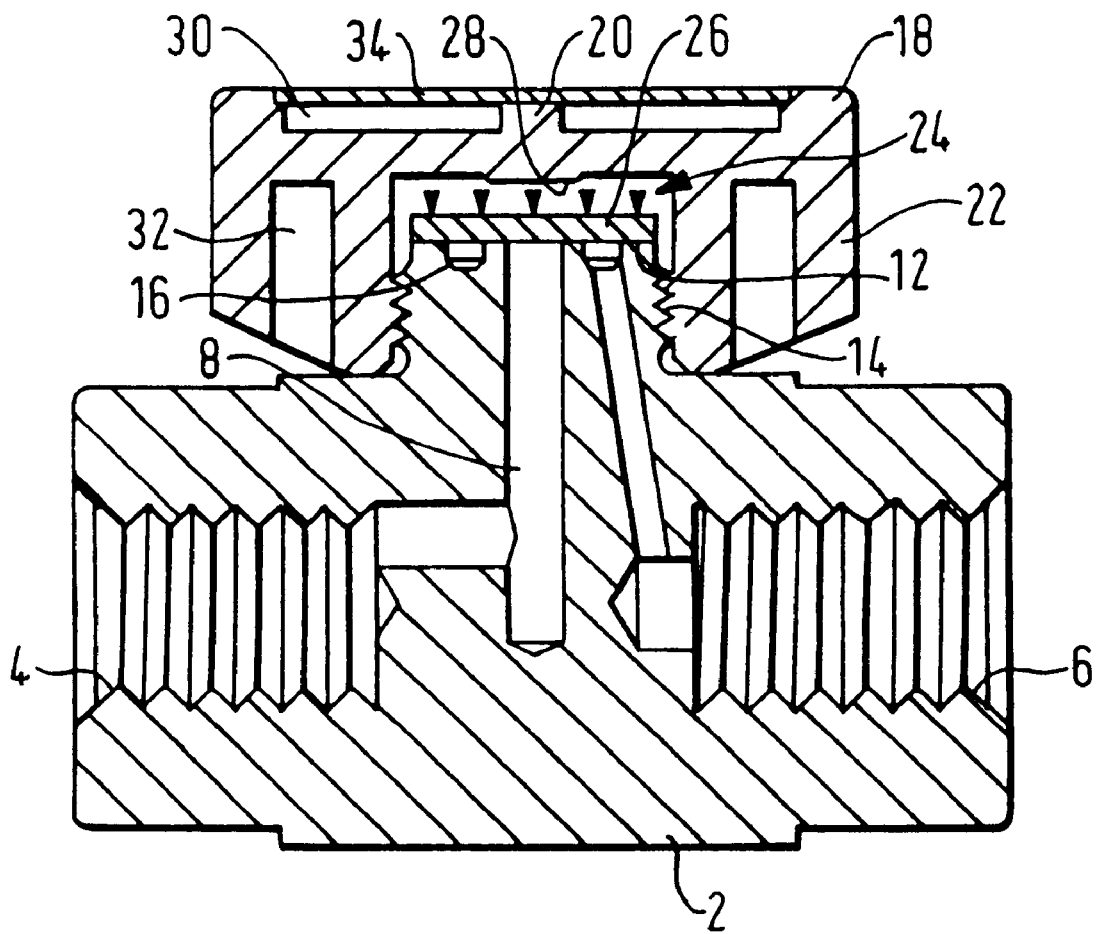
FIG. 3 corresponds to FIGS. 1 and 2 but shows the steam trap in the closed condition.

As the gap between the disc 26 and the seating face 12 becomes smaller and smaller, the velocity of the flowing mixture continues to increase. This causes the pressure between the disc 26 and the seating face 12 to fall still further until it reaches a level at which it can no longer support the disc and the disc moves towards the seat. The movement causes an increase in volume above the disc and the liquid condensate in this space evaporates suddenly, or "flashes off", causing the disc to be held fast on the seat, so closing the trap to the flow of steam and condensate as shown in FIG. 3.

Flash steam within the chamber 24 maintains a high pressure, which keeps the disc 26 on the seating face 22 against the pressure in the pipeline upstream of the trap.

The chamber 24 loses heat to the ambient surroundings, principally through the cap 18. If steam or condensate at high temperature remain in the trap body 2, the heat loss through the cap is replaced, maintaining the steam pressure in the chamber 24. However, as condensate builds up in the region of the trap and begins to cool, the rate of heat loss through the cap 18 will exceed the rate of replacement of heat through the body 2, and the steam in the chamber 24 will condense. This reduces the pressure in the chamber 24, allowing the disc 26 to rise again to the position shown in FIG. 1, whereupon the cycle begins again.

It will be appreciated that the rate of heat loss through the cap 18 affects the cycle time. If the steam trap is exposed to weather conditions, such as low temperatures and rain, the cycle time will be reduced still further. Consequently, the disc 26 will move between its limit positions more often than normal, which may result in premature wear and a reduction in the useful life of the trap as a whole.

By providing the cap 18 with integral thermal insulation by means of the recesses 30 and 32, the cycle time of the trap operation can be extended. As a result of this reduction in the frequency of operation, the actual working life of the trap is also extended. In so doing there is a considerable increase in energy saving.

Although, in the embodiment shown, the recesses 30 and 32 contain air as the insulating medium, other gases or insulating materials could be used. Also, the circumferential recess 32 could be closed at the lower end of the skirt 22, so isolating it from the ambient surroundings.

I claim:

1. A thermodynamic condensate trap comprising:

a trap body having a seating face;

a cap fitted to the trap body and having a stop face, the trap body and the cap defining a trap chamber;

a valve element which is displaceable within the trap chamber between limit positions defined by the stop face and the seating face; and inlet and outlet passages provided in the trap body and emerging at the seating face, whereby seating of the valve element on the seating face under pressure maintained in the trap chamber isolates the inlet and outlet passages from each other thereby to close the trap;

wherein the cap comprises a cap body having a top portion and a circumferential skirt depending from the top portion and defining a side wall of the trap chamber, the top portion having an interior surface on which the stop face is provided, and an outer surface which has a recess covered by a cover element, and the skirt having a lower edge surface which has a circumferential recess, the recesses providing a means for reducing heat transfer between the trap chamber and the ambient surroundings.

2. The thermodynamic condensate trap of claim 1, wherein the recesses contain air.

3. The thermodynamic condensate trap of claim 1, wherein the recess in the outer surface of the top portion is annular.

4. The thermodynamic condensate trap of claim 1, wherein the recess in the skirt is open to the ambient surroundings at the lower edge surface of the skirt.

\* \* \* \* \*